US010001348B2

(12) United States Patent
Zickel

(10) Patent No.: US 10,001,348 B2
(45) Date of Patent: Jun. 19, 2018

(54) DEVICE AND METHOD FOR DISMANTLING EXPLOSIVE DEVICES

(71) Applicant: Robert Zickel, Qiryat Byalik (IL)

(72) Inventor: Robert Zickel, Qiryat Byalik (IL)

( * ) Notice: Subject to any disclaimer, the term of this patent is extended or adjusted under 35 U.S.C. 154(b) by 0 days. days.

(21) Appl. No.: 15/356,849

(22) Filed: Nov. 21, 2016

(65) Prior Publication Data
US 2018/0142993 A1 May 24, 2018

(51) Int. Cl.
F41H 11/12 (2011.01)
B25J 11/00 (2006.01)

(52) U.S. Cl.
CPC ........... F41H 11/12 (2013.01); B25J 11/0025 (2013.01)

(58) Field of Classification Search
CPC .......... F41H 11/12; F41H 11/13; F41H 11/14; F41H 11/16; F41H 11/18; F41H 11/20; F41H 11/30; F41H 11/32; B25J 11/0025; F42B 33/06; F42B 33/062; F42B 33/065; F42B 33/067
USPC ................................................ 86/50; 89/1.13
See application file for complete search history.

(56) References Cited

U.S. PATENT DOCUMENTS

| 4,046,055 | A | * | 9/1977 | McDanolds | ............ | F42B 33/06 102/293 |
| 4,169,403 | A | * | 10/1979 | Hanson | ................. | F42B 33/062 102/293 |
| H162 | H | * | 11/1986 | Sullivan, Jr. | .................. | 102/363 |
| 4,836,079 | A | * | 6/1989 | Barrett | ..................... | F42D 5/045 102/303 |
| 5,210,368 | A | * | 5/1993 | Heller, Jr. | ............... | F41A 19/59 42/84 |
| 5,460,154 | A | * | 10/1995 | Mattern | ................ | B09B 3/0058 124/56 |
| 5,592,170 | A | * | 1/1997 | Price | ....................... | F41H 11/16 342/22 |
| 5,712,441 | A | * | 1/1998 | Grunewald | ............. | F41H 11/16 86/50 |
| 5,988,038 | A | * | 11/1999 | Feintuch | .................. | F41H 11/16 89/1.13 |
| 6,415,666 | B1 | * | 7/2002 | Donskoy | .................. | F41H 11/12 367/87 |
| 6,453,788 | B1 | * | 9/2002 | Lebet | ........................ | F42B 1/02 102/306 |
| 7,350,447 | B1 | * | 4/2008 | Smith | ..................... | F41H 11/16 102/403 |
| 7,600,460 | B2 | * | 10/2009 | Manders | ............... | F41B 9/0031 102/402 |
| 7,814,821 | B2 | * | 10/2010 | Chenel | ....................... | A45F 5/00 102/305 |

(Continued)

Primary Examiner — Joshua E Freeman
(74) Attorney, Agent, or Firm — Reches Patents

(57) ABSTRACT

A device for dismantling explosive devices, the device may include a handle for carrying the robot; a camera; infrared illumination elements; a payload compartment that is configured to hold, in a releasable manner, an explosive device dismantling payload; laser markers that are configured to be at a predefined spatial relationship with an optical axis of the explosive device dismantling payload; a transceiver; a controller that is configured to control the robot, at least partially in response to commands that are received by the transceiver; a base; and a rotation and tilt assembly for moving the payload compartment in relation to the base. The device may be without a driving unit for driving the device from one location to the other.

16 Claims, 19 Drawing Sheets

(56) References Cited

U.S. PATENT DOCUMENTS

| | | | | |
|---|---|---|---|---|
| 8,297,162 B2* | 10/2012 | Fournier | ............... | B63G 7/02 102/403 |
| 2007/0214949 A1* | 9/2007 | Barton | ............... | B63C 7/20 86/50 |
| 2008/0083344 A1* | 4/2008 | Deguire | ............... | F41H 7/005 102/262 |
| 2008/0121097 A1* | 5/2008 | Rudakevych | ............... | F41A 19/58 89/28.05 |
| 2011/0017030 A1* | 1/2011 | Chambers | ............... | B24B 27/0007 83/13 |
| 2014/0062754 A1* | 3/2014 | Mohamadi | ............... | F41H 11/136 342/22 |
| 2014/0130382 A1* | 5/2014 | Harrington | ............... | F41H 11/12 37/195 |
| 2014/0238222 A1* | 8/2014 | McKay | ............... | F41H 11/12 89/1.13 |
| 2014/0245880 A1* | 9/2014 | Rabec Le Gloahec | ... | F41G 3/00 89/1.13 |
| 2016/0354932 A1* | 12/2016 | Bosscher | ............... | B25J 13/025 |

* cited by examiner

115

150

400

DEVICE AND METHOD FOR DISMANTLING EXPLOSIVE DEVICES

This invention was made with US Government support under (contract) awarded by (agency). The US Government has certain rights in the invention.

BACKGROUND

There are few highly expensive robots that are used for bomb diffusion. These robots include large and heavy drive system, they are very expensive, and suffer from low availability. When a bomb diffusion attempt fails, these robots may be damaged and the cost of their repair/replacement is high. In cases where the bomb diffusion is done manually there is an injury danger to the human exposed to the bomb.

SUMMARY

A device for dismantling explosive devices, the device may include a handle for carrying the robot; a camera; infrared illumination elements; a payload compartment that may be configured to hold, in a releasable manner, an explosive device dismantling payload; laser markers that are configured to be at a predefined spatial relationship with an optical axis of the explosive device dismantling payload; a transceiver; a controller that may be configured to control the robot, at least partially in response to commands that are received by the transceiver; a base; and a rotation and tilt assembly for moving the payload compartment in relation to the base. The device may be without a driving unit for driving the device from one location to the other.

The controller may be configured to control an intensity of the infrared illumination elements in response to an infrared illumination command received by the transceiver.

The controller may be configured to control a field of view of the camera in response to a camera command received by the transceiver.

The camera, when directed towards the explosive device and when configured to have a field of view that may include laser marks formed by the laser markers, may be configured to image the explosive device and the laser markers.

The device that may include the explosive device dismantling payload, wherein the explosive device dismantling payload is selected from a solid state laser, a radio frequency transmitter and a shooting unit that may be configured to shoot the explosive device.

The device may include a tripod that is detachably coupled to the base.

The device may include a bean bag that is detachably coupled to the base.

The device may include an additional interface for interfacing the device with a payload deceleration device such as a parachute.

The device may include an additional interface that may include one or more Piccatini rails.

The laser markers are positioned at the general direction of the payload.

The device may include wired communication ports for receiving communication over wired links; wherein the transceiver may be configured to communicate over the wired links and over wireless links.

The device may consist essentially of the handle, the camera, the infrared illumination elements, the payload compartment, the laser markers, the transceiver, the controller, the base and the rotation and tilt assembly.

The device may include a frame and a central module; wherein the central module may be configured to rotate in relation to the frame; wherein the frame is coupled to the base; wherein the central module may include the payload compartment, the camera, the laser markers and the infrared illumination elements.

According to an embodiment of the invention there may be provided a device for dismantling explosive devices, the device may include a handle for carrying the robot; a camera; infrared illumination elements; a payload compartment that may be configured to hold, in a releasable manner, an explosive device dismantling payload; laser markers that are configured to be at a predefined spatial relationship with an optical axis of the explosive device dismantling payload; a transceiver; a controller that may be configured to control the robot, at least partially in response to commands that are received by the transceiver; wherein the commands comprise an infrared illumination command for controlling an intensity of illumination of the infrared illumination elements.

According to an embodiment of the invention there may be provided a method for calibrating a robot, the method may include placing an illuminating payload within a payload compartment of a robot; illuminating a target by the illuminating payload and by laser markers of the robot; and changing a spatial relationship between at least one of the laser markers and the illuminating payload to obtain a desired spatial relationship between an optical axis of the illuminating payload and optical axes of the laser markers; wherein the device essentially consists of a handle for carrying the robot; a camera; infrared illumination elements; the payload compartment; the laser markers, a transceiver; a controller that may be configured to control the robot, at least partially in response to commands that are received by the transceiver, a base and a rotation and tilt assembly for moving the payload compartment in relation to the base.

The method may include replacing the illuminating payload by an explosive device dismantling payload.

The illuminating payload may be an explosive device dismantling payload.

According to an embodiment of the invention there may be provided a method for dismantling an explosive device, the method may include: sending from a device an image of an explosive device and laser marks generated by laser markers of the robot; wherein the device is positioned, using a handle of the robot, at a desired position by an entity that differs from the robot; wherein when positioned at the desired position the device may be configured to dismantle the explosive device using an explosive device dismantling payload that is coupled in a releasable manner to a payload compartment of the robot; receiving, by a separate wired or wireless transceiver, a command to dismantle the explosive device and performing, by the explosive device dismantling payload, and in response to the command to dismantle the explosive device, an explosive device dismantling operation.

The command to dismantle the explosive device may be relayed via a range expansion unit.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
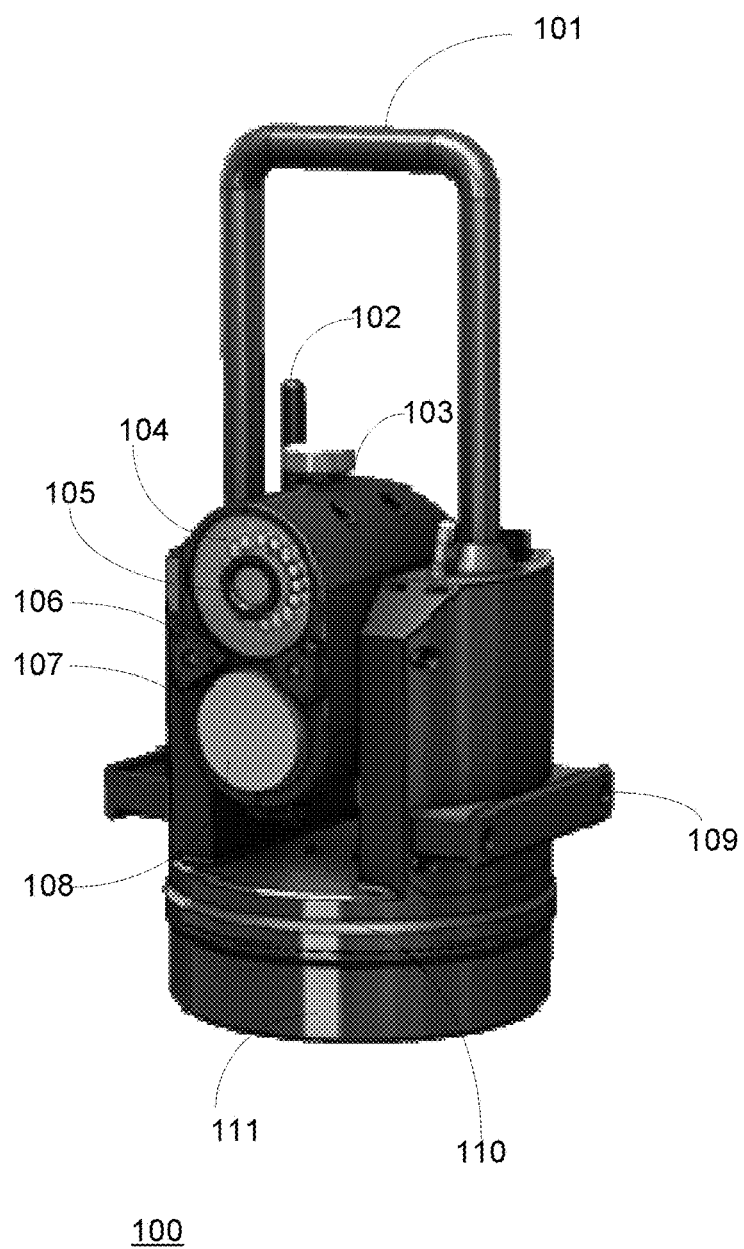
FIG. 1 is a front view of the device according to an embodiment of the invention.
Figure 2:
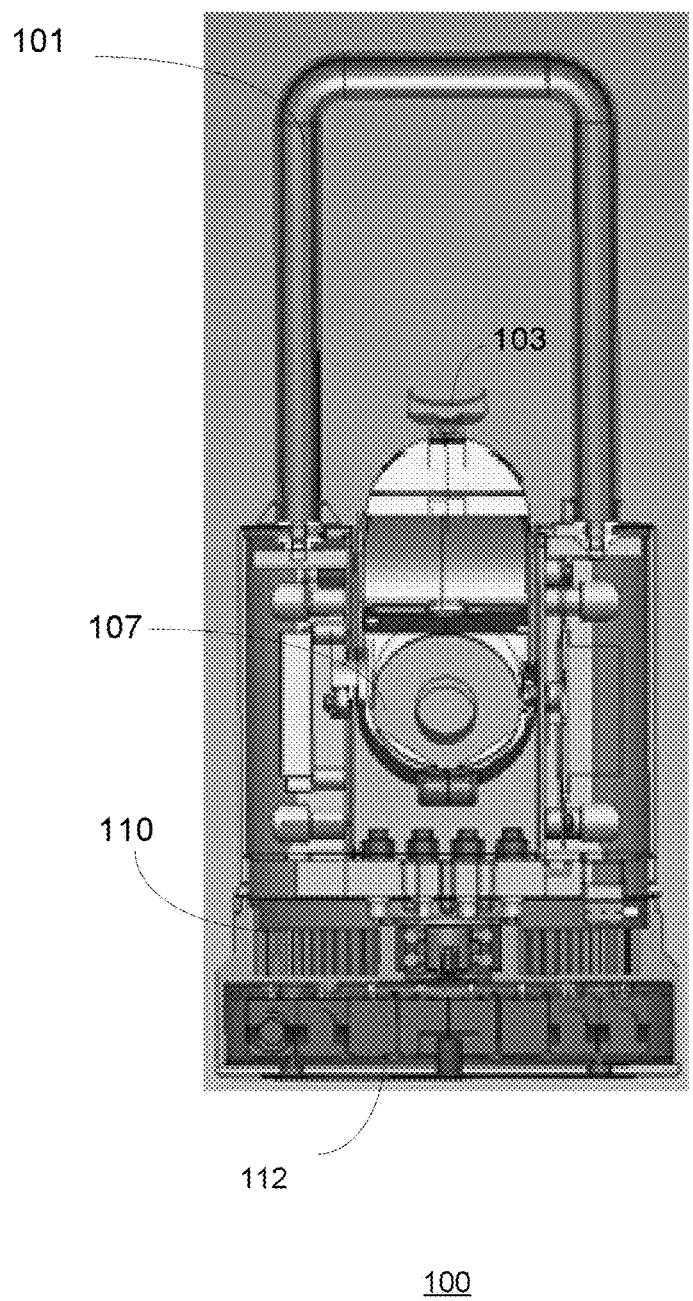
FIG. 2 is a rear view of the device according to an embodiment of the invention.
Figure 3:
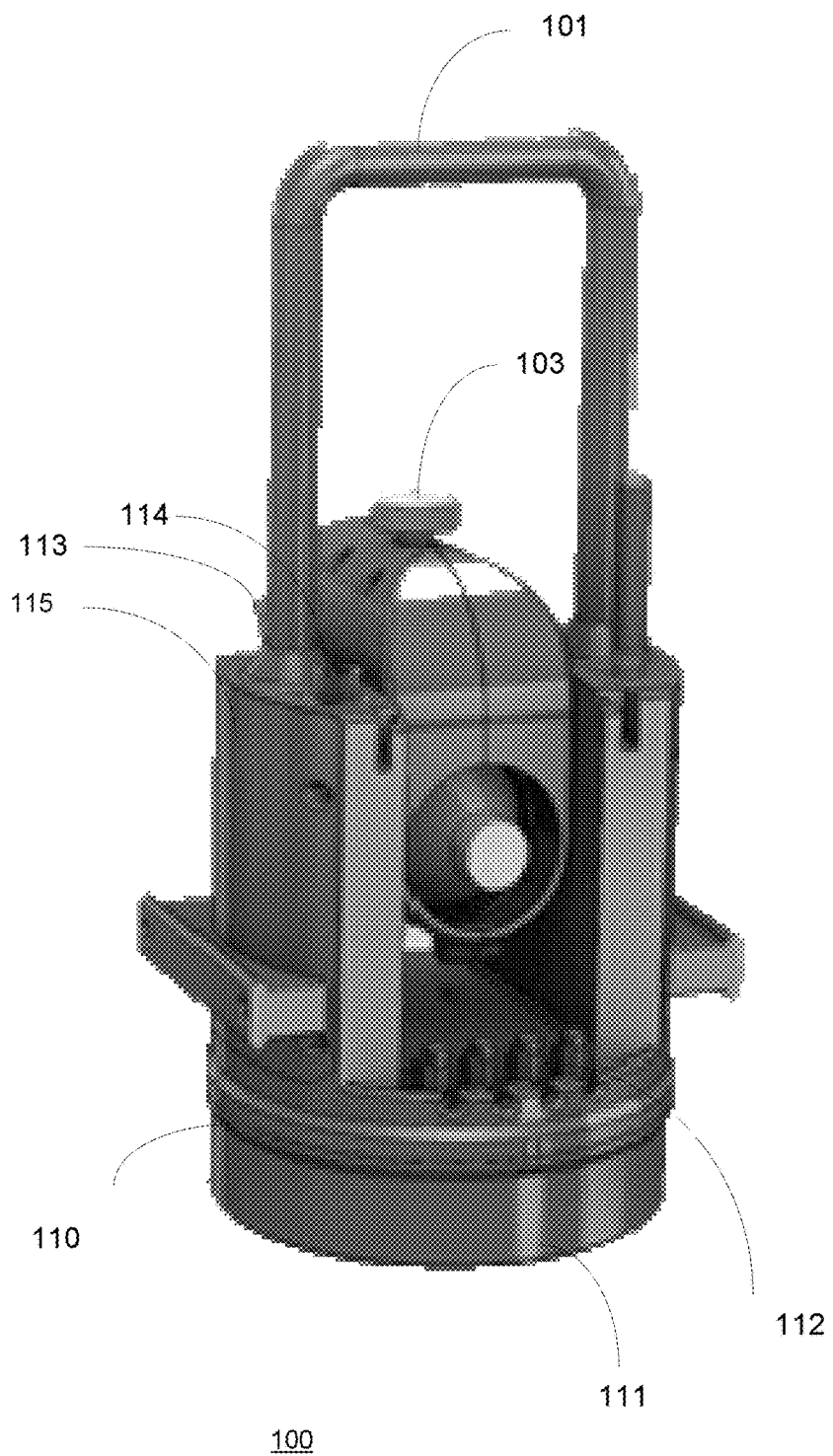
FIG. 3 is a rear view of the device according to an embodiment of the invention.
Figure 4:
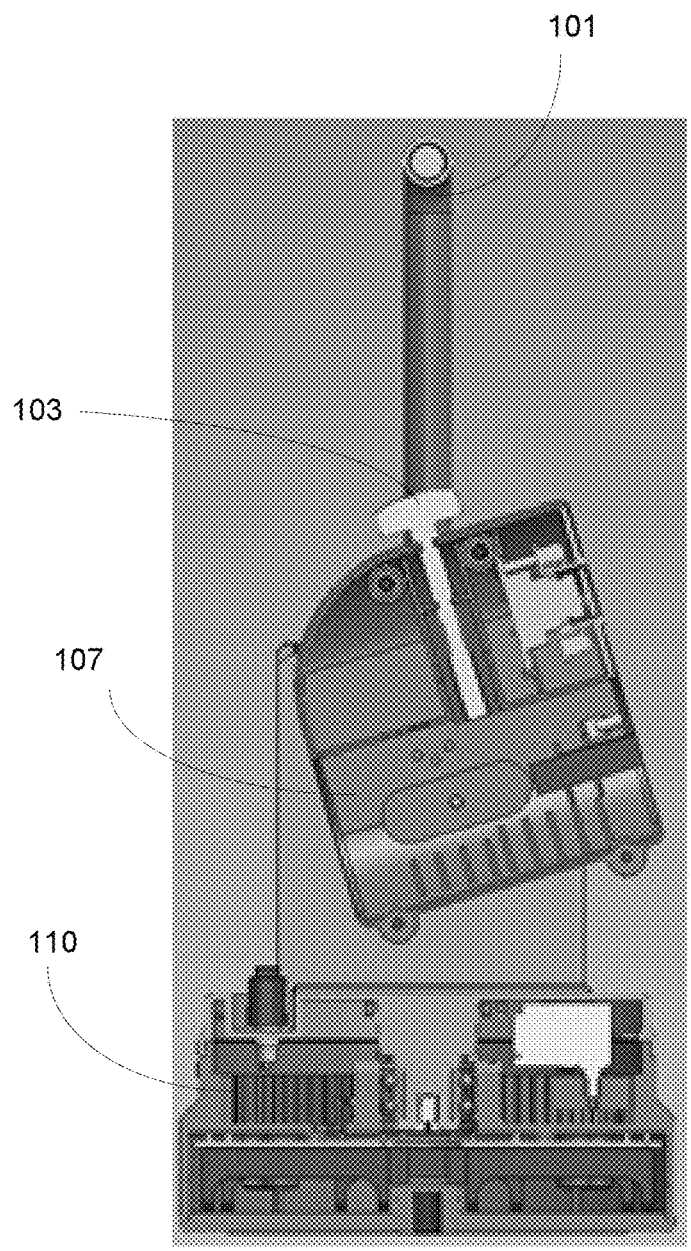
FIG. 4 is a cross sectional view of the device taken along a longitudinal plane according to an embodiment of the invention.
Figure 5:
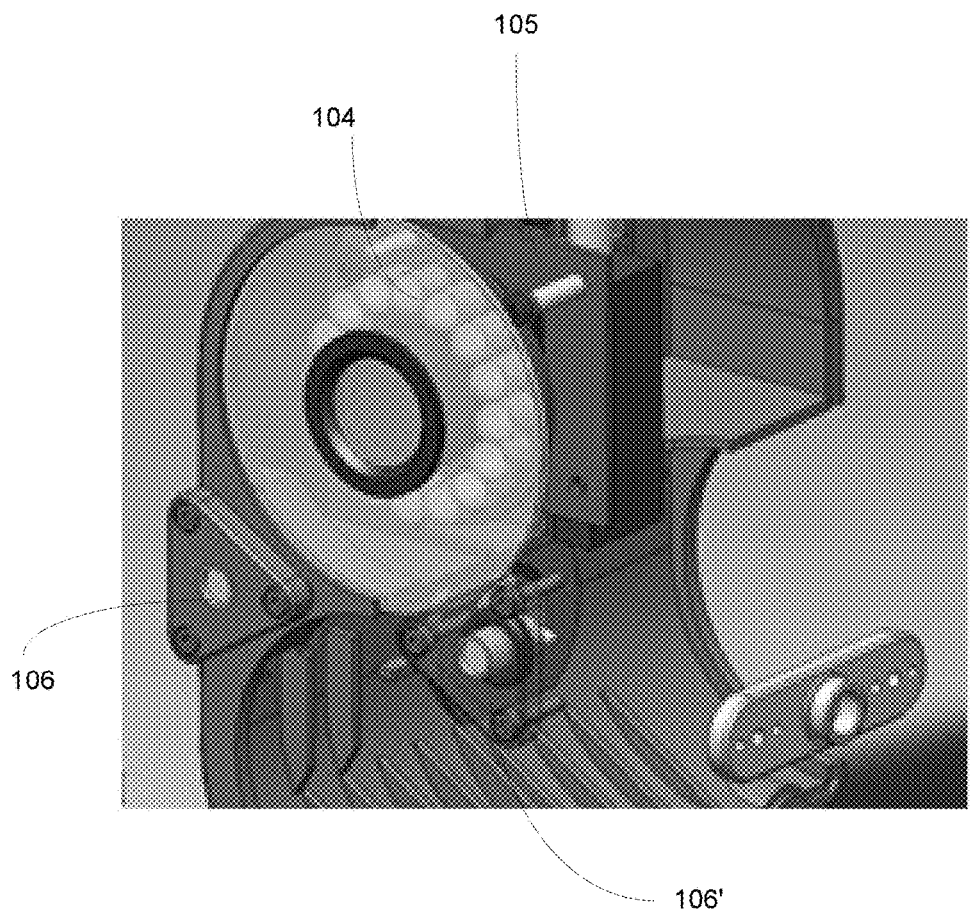
FIG. 5 is a front view of infrared LEDs a camera and two laser markers of the device according to an embodiment of the invention.
Figure 6:
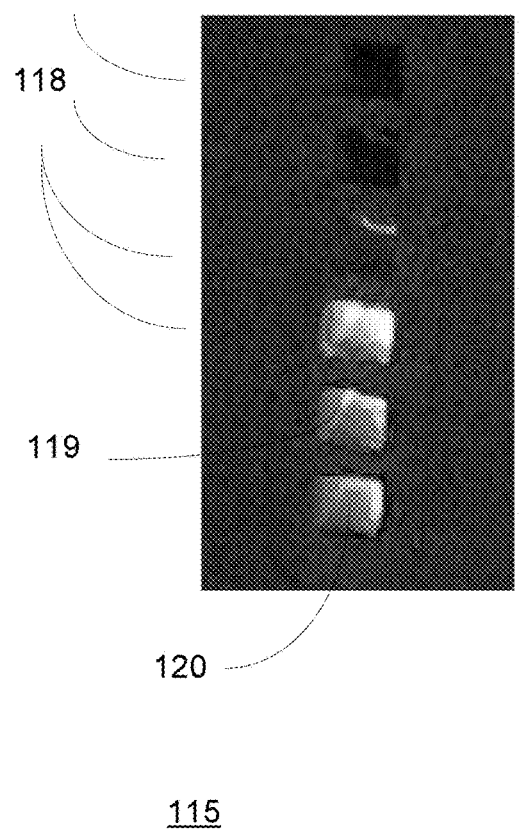
FIG. 6 illustrates a LED array of the device according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The term "carrying handle" and "handle are used in an interchangeable manner and mean any interface that allows carrying the device.

There is provided a system for dismantling explosive devices. The system may include a device, a computerized control unit and may also include a range extension unit. The system enables a rapid exploration of objects such as explosive devices and rapid dismantling of explosive devices while the operator may use the computerized control unit to remotely control a device. The device can be positioned in proximity to the explosive device by a person or by an unmanned system. The device can include a payload that may dismantle the explosive device using, for example, transmitted radiation or elements that are fired towards the explosive device.

Figure 19:
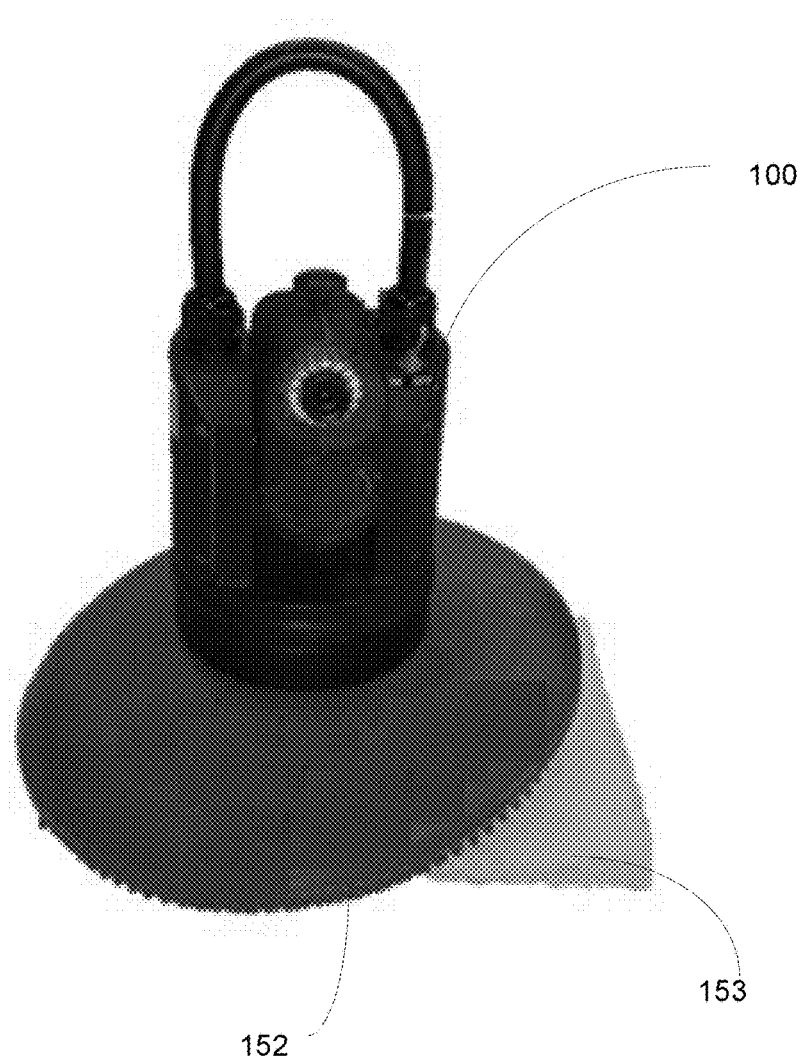
FIG. 19 illustrates a device that includes a bean bag according to an embodiment of the invention.

Referring to FIGS. 1-9 and 18-19, device 100 include the following elements:
   a. Carrying handle 101.
   b. Antenna 102.
   c. Payload tightening knob 103.
   d. Infrared light emitting diodes (LEDs) 104.
   e. Camera 105.
   f. Laser markers (designators) 106 and 106'.
   g. Payload compartment 107 that may carry a detachable payload 108.
   h. An interface such as Piccatini rails 109 for accessories.
   i. Rotating and tilt assemblies 110 (these assemblies may include a separate tilt assembly and a separate rotate assembly).
   j. Base 111. The bottom of base 111 may be covered with Velcro to allow placement of a bean bag that allow the device to remain vertical while placed on a slope. The base may include or may be connected to a vertical translation device.
   k. Terminal boards 112. It may be connected to multiple wires for remote (wired) control of the robot.
   l. Power Switch 113.
   m. Charging connector 114.
   n. LED array 115 (see FIG. 6) includes four LEDs 118 for providing an indication about the signal intensity, a communication establishment LED 119 and a power indicator LED 120.
   o. Tripod (denoted 151 in FIG. 18).
   p. Bean bag (denoted 152 in FIG. 19—FIG. 19 illustrates obstacle 193 that is not a part of the device but represents an obstacle on which the bean bag can be mounted).

It is noted that the device may have some or all of these components, any combination or sub-combination of mentioned above components, and maybe limited to have these components. For example the device may have only one out of a tripod and a bean bag—or may not include any one of the tripod and the beam bag.

The number, shape and size of components of the device may vary. For example—the device may include one or more than two laser markers.

The device 100 includes a transceiver (not shown), a controller (not shown) and/or a location unit such as a GPS unit (not shown). The controller controls the operation of the device 110. The controller may communicate with a device control unit. The device may have a unique identifier that is transmitted by the transceiver.

The payload 108 and/or the payload compartment (or any other component of device 110) may include an Altitude Heading Reference System (AHRS) that may help the operator to report the direction of the payload.

The carrying handle allows catching the device (by human, or by animal or by another device) in an easy and reliable manner. This allows a fast and simple deployment—which is beneficial when diffusing bombs. The carrying handle can be modified to accommodate various gripping devices The device is compact and is aimed to explore remote area of interest by pan & tilt of the camera 105 and payload 108. The device may be battery operated and thus it doesn't require any external wiring for power.

The device has a rotating assembly and is capable of rotating by a pan train system, for example with a geared stepper motor. The rotating assembly may include gear wheels or friction wheels 360 degree. The elevation assembly may include a servo motor that may tilts the camera and payload, or may include a vertical stage with linear gear which allows the operator to explore it's surrounding and broadcast the video to the operator. The operator is able to identify point of interest and use laser designators to mark the point of interest.

The device may be operated at day or night. For low light operation the operator may selects (using the device control unit) the required IR led intensity which may depend, for example, on the distance to the point of interest in order to avoid image saturation.

The antenna 102 may be any type of antenna—and may be selected according to a wireless communication to be used by the device—for example WiFi. The antenna may receive and transmit video streams, images and control data.

The payload tightening knob 103 allows tightening the payload 108 to the payload compartment. A typical payload for neutralizing a bomb is a disruptor or a shape charge liner that are of a variety of diameter. To allows bore-sighting with the camera and the laser designators of all possible cylindrical payloads, the payload 108 is pressed by rotating the payload tightening knob 103 and its screw relative to a square nut that moves downward to press the payload 108 against a V shape bottom.

It is noted that the payload may be coupled to the payload compartment in various manners. For example the payload may be attached to the payload compartment via a payload bracket that is equipped with a fast lock and release device to avoid unwanted release of payload while assuring fast release when needed. The payload bracket may include springs and balls that are pressed against a niches in the payload. The payload bracket may hold the payload during movements of the device but when the payload should be ejected from the payload compartment (for example when the payload should be ejected (fired) towards the explosive device then these balls cannot overcome the high recoil force and the payload may be easily separated from the payload compartment.

Power switch 113 may be a toggle switch that serves for firm operation and needs to be pulled for changing position to avoid unwanted movements.

External connector 114 allows operating the device with external batteries and enabling updating the robot's software.

The IR LEDs 104 may be operated with variable intensity feature which may maintain good visibility while placing the device at different distances from the target. The IR LED serves for illumination in low light condition. Since we operate the distance from the target may vary between few centimeters to more than a meter there is a need to remotely select the IR LED intensity to avoid camera saturation.

Figure 7:
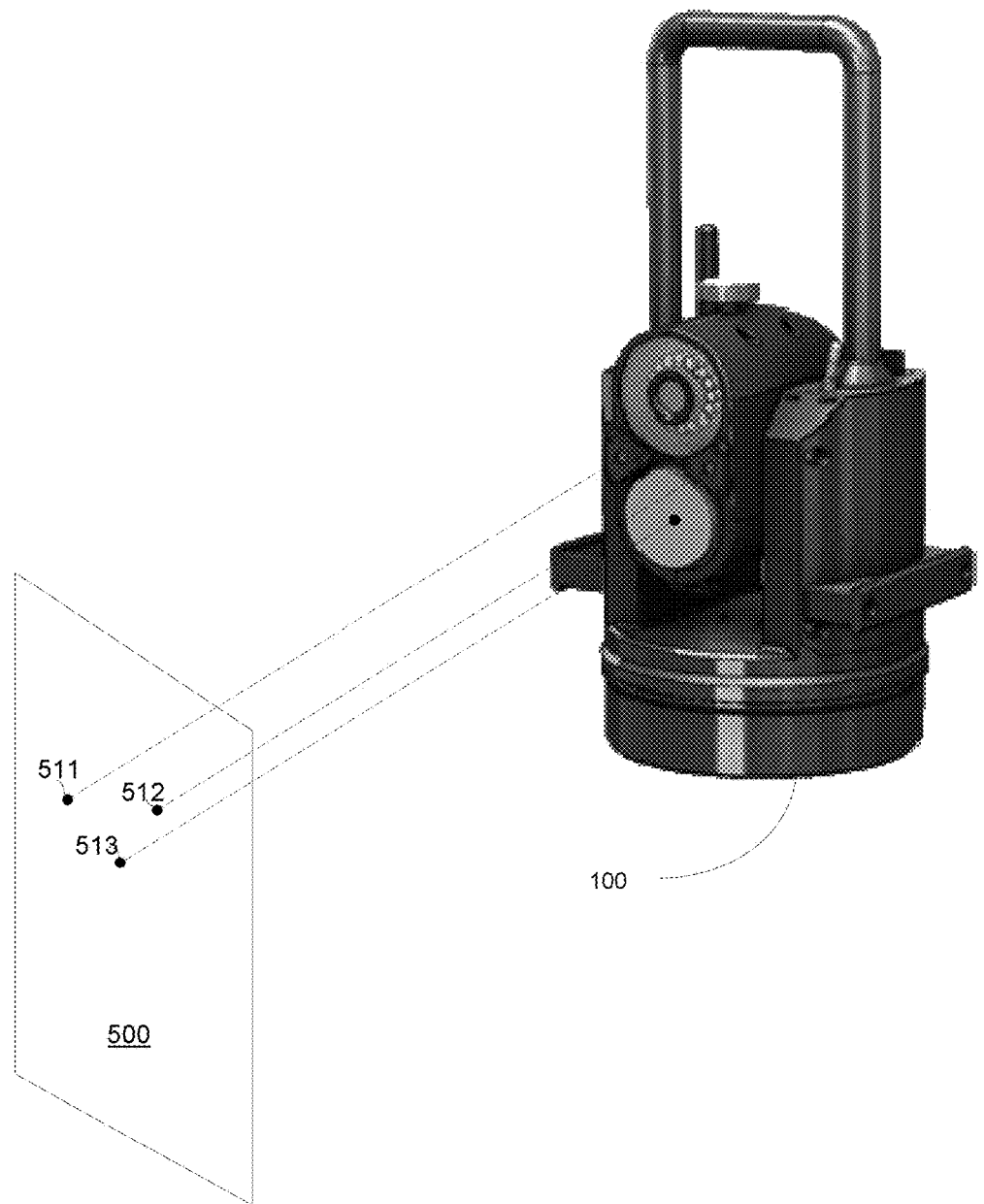
FIG. 7 illustrates a calibration process of the device according to an embodiment of the invention.

Laser designators 106 and 106' may be bore-sighted with the payload. FIG. 7 illustrates a calibration process in which a target 500 is illuminated at three points 511, 512 and 513—from laser beams that are emitted from laser marker 106, payload 108 and laser marker 106'. The calibration may involve moving the laser designators 106 and 106' until reaching a predefined relationship between points 511, 512 and 513. The calibration may be done, for example, by rotating multiple screws that are connected to laser designator frames that are rigidly connected to the laser markers.

Once the predefined relationship is achieved the operator knows the spatial relationship between the laser beams emitted from the laser markers and the longitudinal axis of the payload.

Even if the payload does not include a light emitter—the device can rotate and/or change an angle of orientation in order to direct the longitudinal axis of the payload towards a desired point of interest—given the location of the laser beams emitted by the laser markers.

Figure 8:
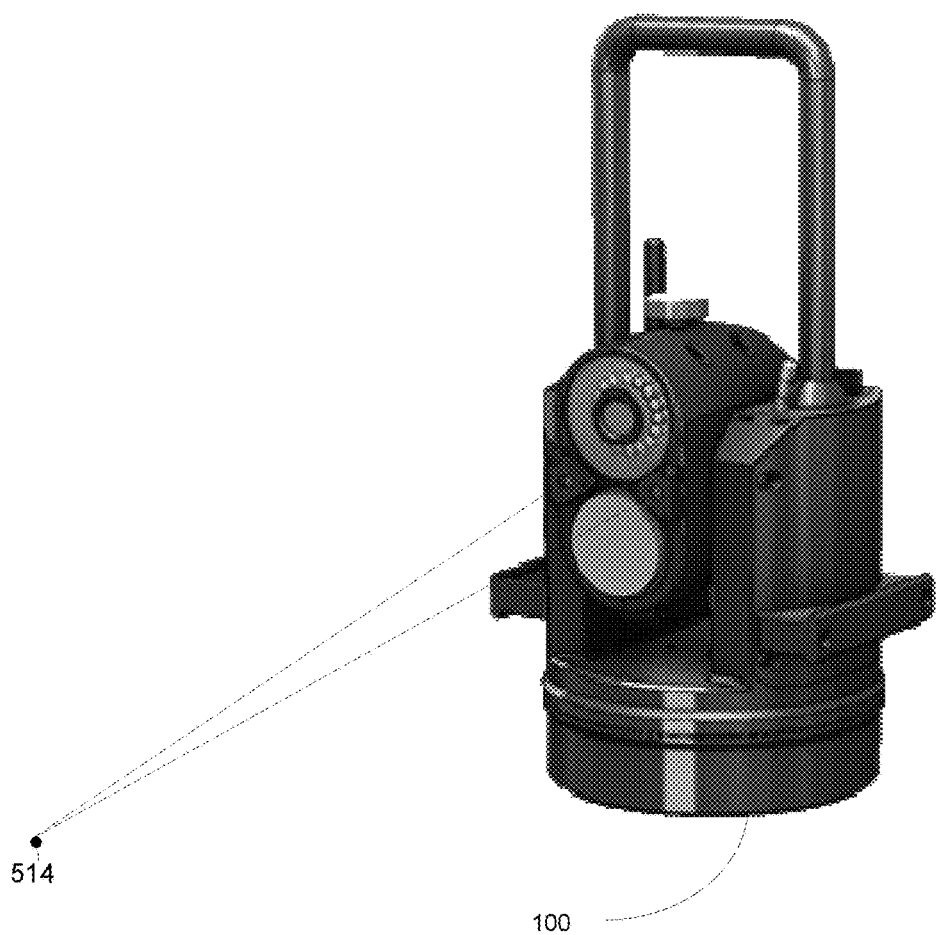
FIG. 8 illustrates a calibration process of the device according to an embodiment of the invention.
Figure 9:
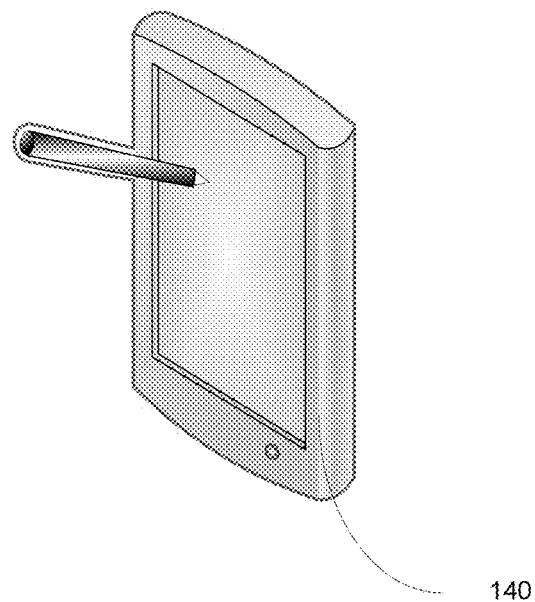
FIG. 9 illustrates a device control unit according to an embodiment of the invention.

FIG. 8 illustrates a calibration process during which the laser beams emitted by laser markers 106 and 106' are directed towards a single point 514 and form two edges of an imaginary triangle. This allows the device to estimate a distance to a target—when the target crosses the laser beams emitted by laser markers 106 and 106'—the distance between the spots formed on the target is indicative of the distance to the robot.

The laser marker may be connected to a flange that may be connected to the device by three screws. The laser markers may be glued to the flange and equipped with a rubber "O" ring that allows changing its pitch and yaw. The laser marker calibration is important since it is possible to view them even if there is no good video image. An alternative method for bore-sighting the payload is by marking the bore-sighted laser spots on the target.

Figure 10:
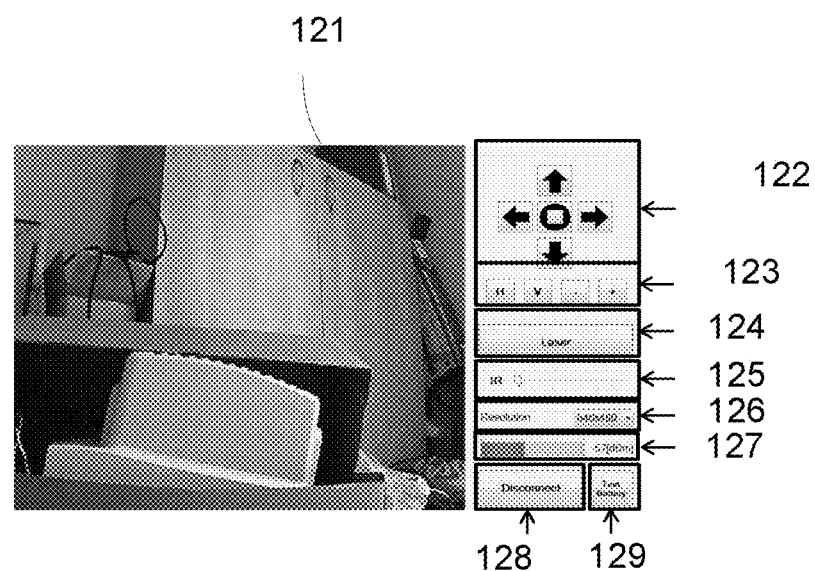
FIG. 10 illustrates a screen shot of a device control unit according to an embodiment of the invention.

The device can be controlled by a device control unit (denoted 140 in FIG. 9) such as a laptop computer, a tablet or any computerized device having processing and telecommunication capabilities. FIG. 10 illustrates a screen shot of a display of the device control unit—the screen shot shows an image 121 obtained by camera 105 as well as soft control buttons/indicators:
  a. Camera Navigation arrows 122.
  b. Picture Adjustment control buttons 123.
  c. Laser Activation button 124.
  d. IR Intensity control 125.
  e. Image resolution selector 126.
  f. Communication Intensity indicator 127.
  g. Battery Test control button 129.
  h. Connect/Disconnect control button 128.

Figure 11:
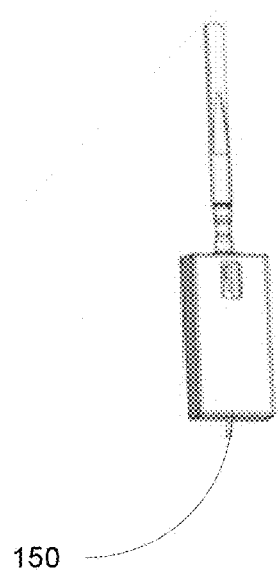
FIG. 11 illustrates a device range extension unit according to an embodiment of the invention.

FIG. 11 illustrates a range extension unit 150 according to an embodiment of the invention for extending the range of communication between the device and the device control unit.

There may be a long range extension unit with a directional antenna mounted on a tripod or a shorter range extension unit with an Omni directional antenna.

Figure 12:
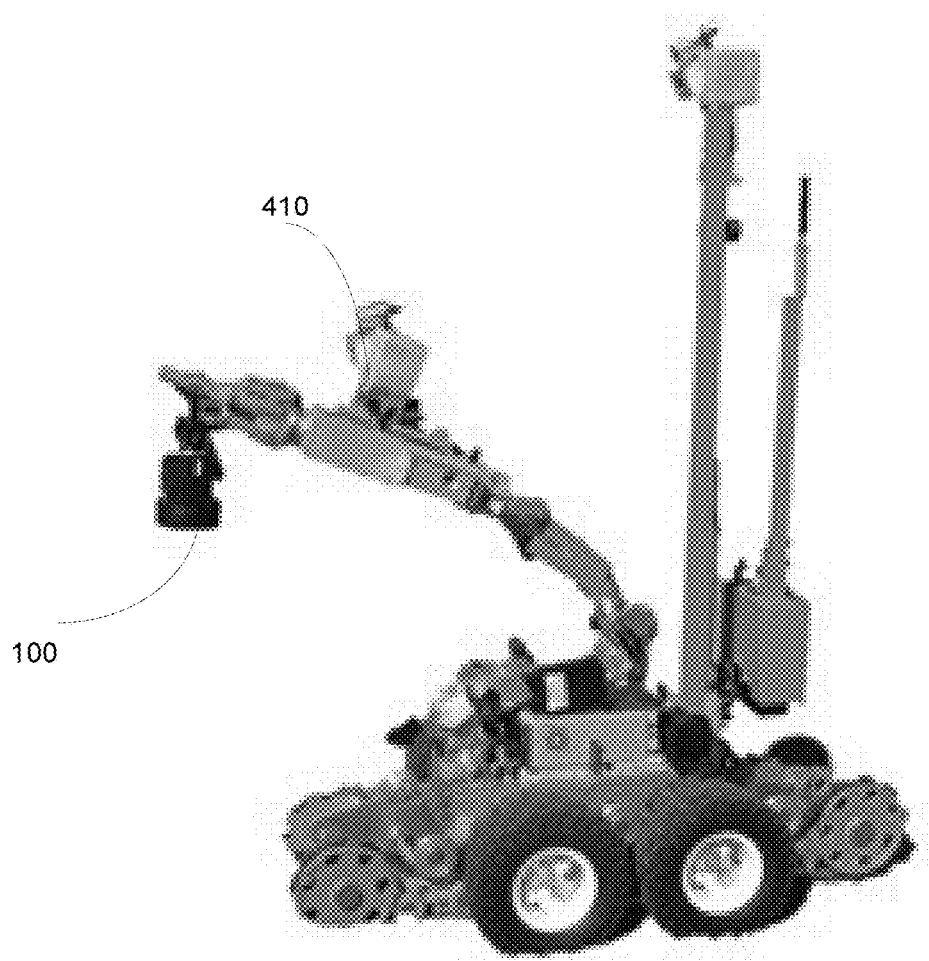
FIG. 12 illustrates a robotic vehicle that carries the device according to an embodiment of the invention.
Figure 13:
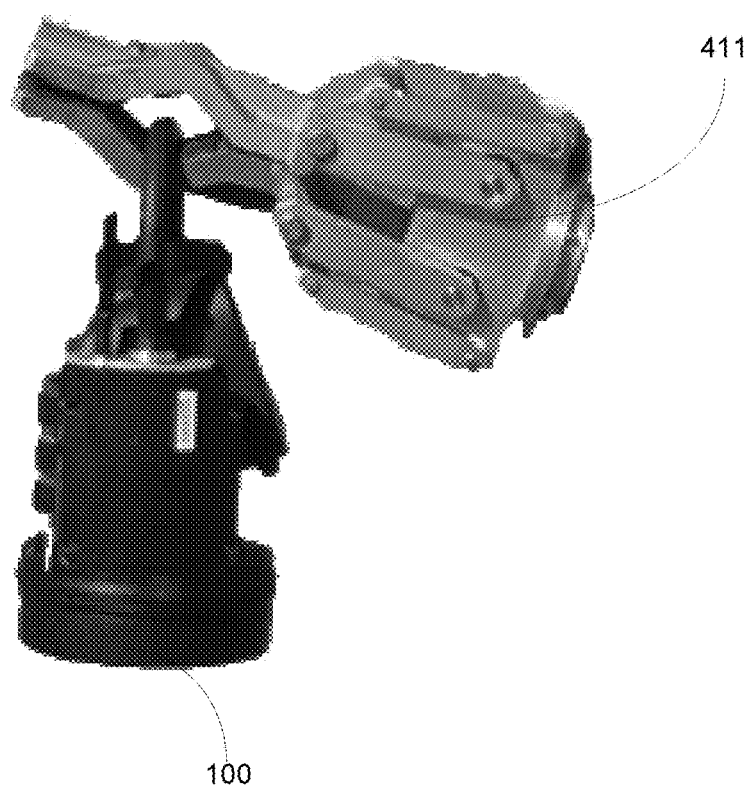
FIG. 13 illustrates a robotic arm of the robotic vehicle that carries the device according to an embodiment of the invention.
Figure 14:
FIG. 14 illustrates persons, land and aerial robotic vehicles that are configured to carry the device according to an embodiment of the invention.

FIG. 12 illustrates a robotic vehicle 410 that carries the device according to an embodiment of the invention. FIG. 13 illustrates a robotic arm 411 of the robotic vehicle that carries the device according to an embodiment of the invention. FIG. 14 illustrates persons, land and aerial robotic vehicles (collectively denoted 400) that are configured to carry the device according to an embodiment of the invention.

Figure 15:
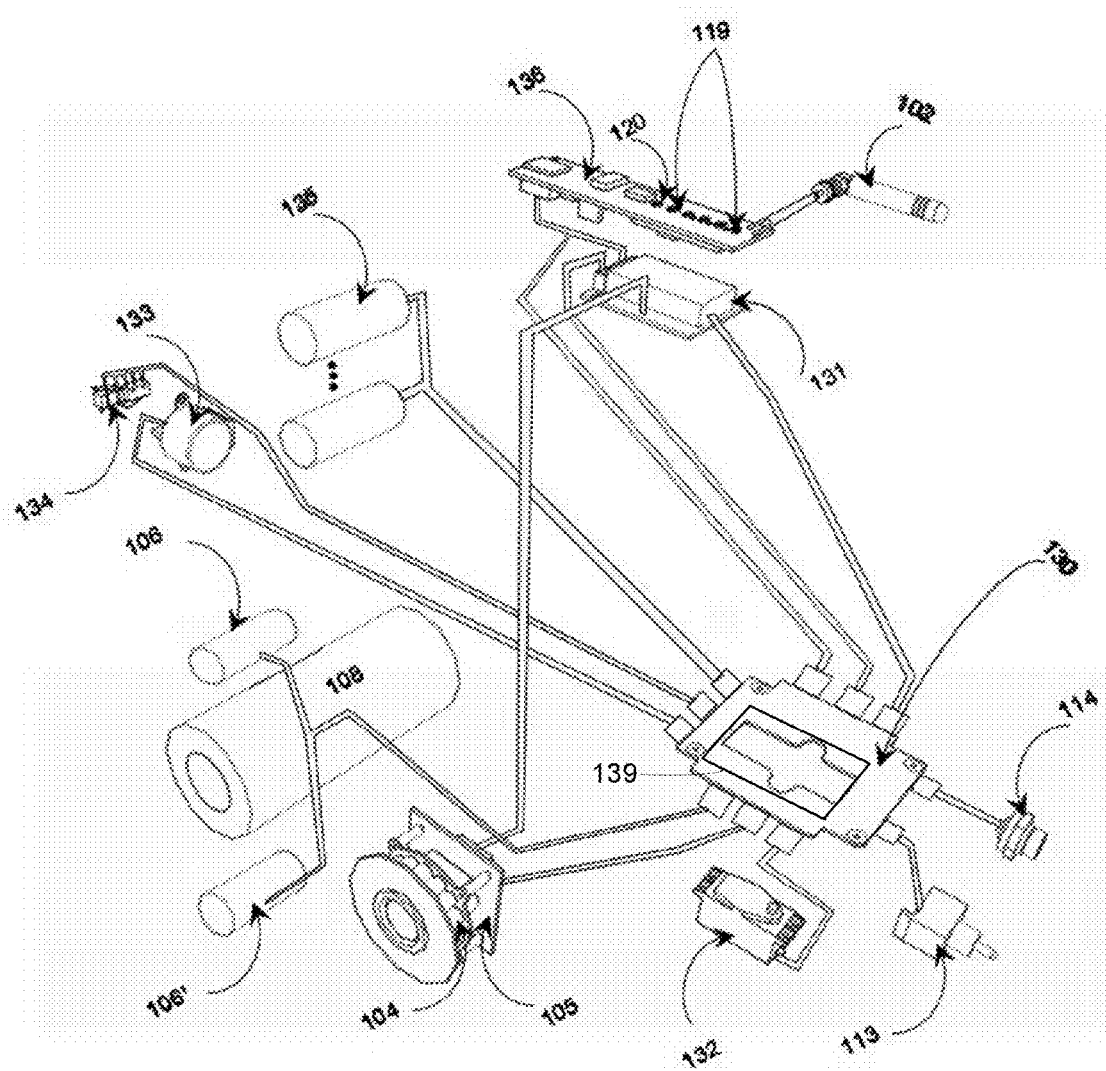
FIG. 15 illustrates various components of the device according to an embodiment of the invention.

FIG. 15 illustrates various components of the device according to an embodiment of the invention.

These components include:
a. Controller 139.
b. Controller board 130.
c. Video compressor and video compressor board (collectively denoted 131). The video compressor may compress image data sensed by camera before the image data is transmitted by the transceiver and/or stored in the robot.
d. Batteries 135.
e. Tilt motor 132 (part of rotating and tilt assemblies 110).
f. Pan motor 133 (part of rotating and tilt assemblies 110).
g. Limit switch 134. The state of the limit switch may represent allowable operational parameters of one or more components (such as motors) of the robot. The operational parameters may refer to a maximal torque, a maximal power, a maximal voltage, maximal rotation angle, or a maximal current consumption.
h. Transceiver 136.
i. Power Switch 113.
j. Charging connector 114.
k. Laser markers 106 and 106'.
l. Antenna 102.
m. Infrared LEDs 104.
n. Camera 105.

The controller 139 is configured to control the robot. Controller 139 is coupled to the controller board 139 and may be configured to receive power (from batteries 135 and/or charging connector) and control the distribution of power to various components of the robot. Controller 139 may activate engines such as pan motor 133 and/or tilt motor 132 of the rotating and tilt assemblies 110. Controller 139 may control the activation (and set activation parameters such as intensity) of the infrared LEDs 104, may control camera 105, may control the laser markers 106 and 106', the transceiver and the like.

The motors of the rotating and tilt assemblies 110 may be of any known kind. For example—a DC motor with a static magnet, a motor with a linear screw, a brushless motor, a step motor. A motor may be coupled to a transmission gear. Alternatively—a motor may be directly coupled to other components of the device—without a transmission gear.

The controller may control one or more motors based upon feedback regarding the motor. The feedback may be provided by a sensor such as a photovoltaic sensor, a rotation sensor, a hall sensor, a magnetic sensor and the like.

Figure 16:
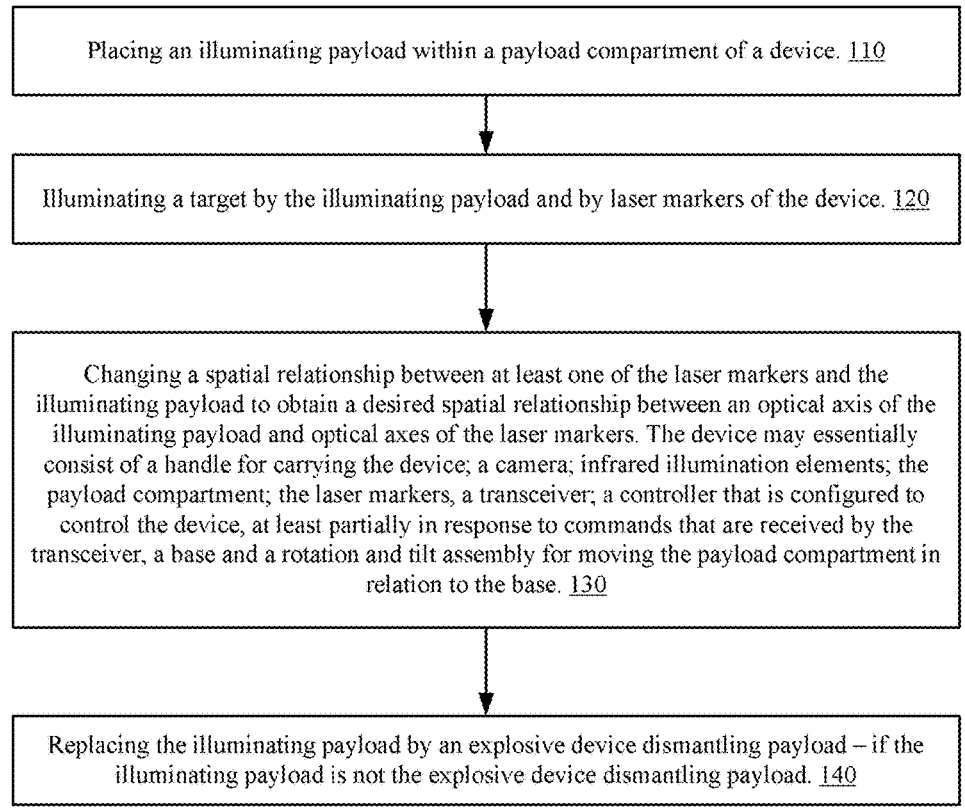
FIG. 16 illustrates a method according to an embodiment of the invention.

FIG. 16 illustrates method 100 according to an embodiment of the invention

Method 100 may start by step 110 of placing an illuminating payload within a payload compartment of a robot.

Step 110 may be followed by step 120 of illuminating a target by the illuminating payload and by laser markers of the robot.

Step 120 may be followed by step 130 of changing a spatial relationship between at least one of the laser markers and the illuminating payload to obtain a desired spatial relationship between an optical axis of the illuminating payload and optical axes of the laser markers. The device may essentially consist of a handle for carrying the robot; a camera; infrared illumination elements; the payload compartment; the laser markers, a transceiver; a controller that is configured to control the robot, at least partially in response to commands that are received by the transceiver, a base and a rotation and tilt assembly for moving the payload compartment in relation to the base.

The method may include step 140 of replacing the illuminating payload by an explosive device dismantling payload—if the illuminating payload is not the explosive device dismantling payload.

According to an embodiment of the invention the illuminating payload is an explosive device dismantling payload.

Figure 17:
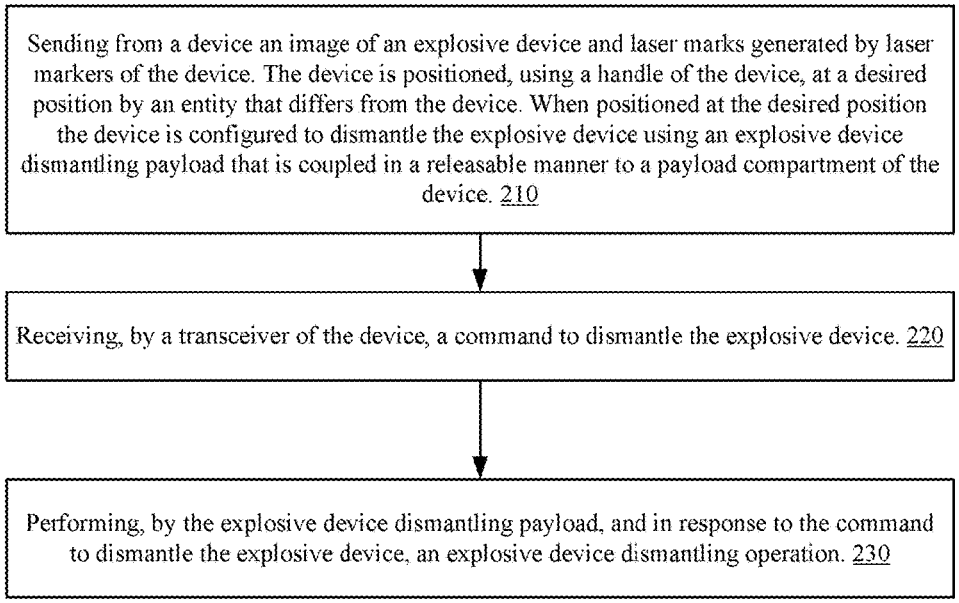
FIG. 17 illustrates a method according to an embodiment of the invention.
Figure 18:
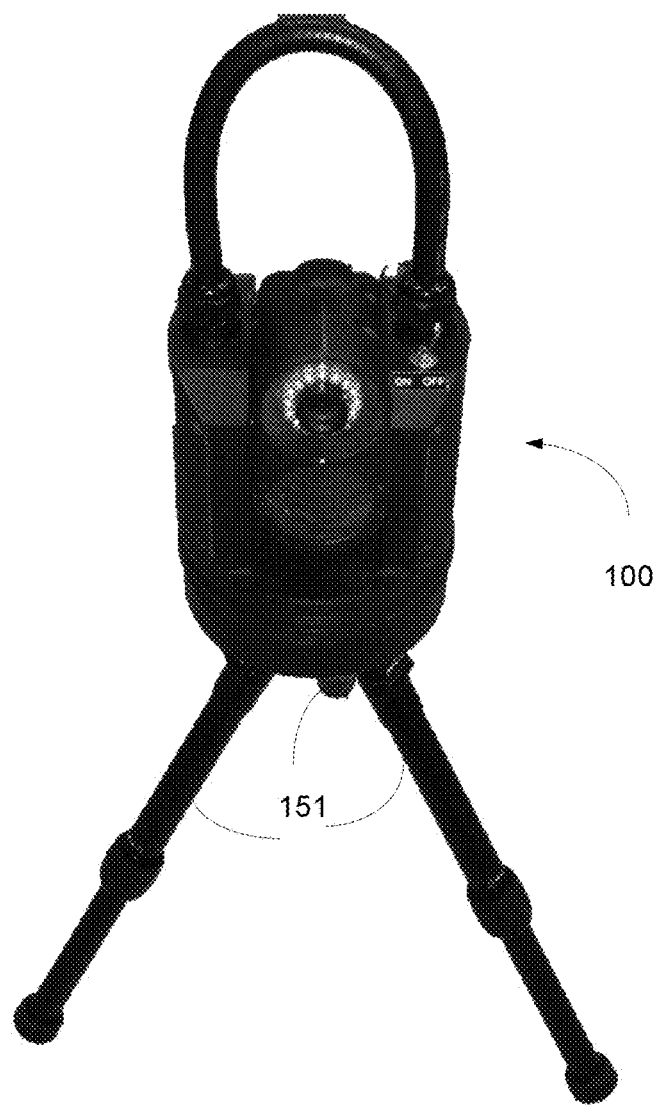
FIG. 18 illustrates a device that includes a tripod according to an embodiment of the invention.

FIG. 17 illustrates method 200 according to an embodiment of the invention.

Method 200 may start by step 210 of sending from a device an image of an explosive device and laser marks generated by laser markers of the robot. The device is positioned, using a handle of the robot, at a desired position by an entity that differs from the robot. When positioned at the desired position the device is configured to dismantle the explosive device using an explosive device dismantling payload that is coupled in a releasable manner to a payload compartment of the robot.

Step 210 may be followed by step 220 of receiving, by a transceiver of the robot, a command to dismantle the explosive device.

Step 220 may be followed by step 230 of performing, by the explosive device dismantling payload, and in response to the command to dismantle the explosive device, an explosive device dismantling operation.

The command to dismantle the explosive device may be relayed via a range expansion unit or a separate communication or activation link.

According to an embodiment the device includes multiple cameras. The multiple cameras may have different optical axes and their images may be processed to provide depth information and/or three dimension information. The multiple camera may include camera 105 and on e or more additional camera. The one or more additional cameras may be located at any location and may be coupled to any element of the device.

It is noted that depth information may be provided from a single camera—such as camera 105 of FIG. 1.

According to an embodiment of the invention the device includes a sniffer. The sniffer may be configured to detect explosive materials. The sniffer can be located within the payload compartment, may be directly or indirectly coupled to the payload compartment. The sniffer can be coupled to the payload compartment via a telescopic arm or any other movable element.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A device for dismantling explosive devices, the device comprises:
   a handle for carrying the device;
   a camera;
   infrared illumination elements;
   a payload compartment that is configured to hold, in a releasable manner, an explosive device dismantling payload;
   laser markers that are configured to be at a predefined spatial relationship with an optical axis of the explosive device dismantling payload;
   a transceiver;
   a controller that is configured to control the device, at least partially in response to commands that are received by the transceiver;
   a base; and
   a rotation and tilt assembly for moving the payload compartment in relation to the base;
   wherein the device is without a driving unit for driving the device from one location to the other.

2. The device according to claim 1 wherein the controller is configured to control an intensity of the infrared illumination elements in response to an infrared illumination command received by the transceiver.

3. The device according to claim 1 wherein the controller is configured to control a field of view of the camera in response to a camera command received by the transceiver.

4. The device according to claim 1 wherein the camera, when directed towards the explosive device and when configured to have a field of view that comprises laser marks formed by the laser markers, is configured to image the explosive device and the laser markers.

5. The device according to claim 1 that comprises the explosive device dismantling payload, wherein the explosive device dismantling payload is selected from a solid state laser, a radio frequency transmitter and a shooting unit that is configured to shoot the explosive device.

6. The device according to claim 1, comprising a tripod that is detachably coupled to the base.

7. The device according to claim 1, comprising a bean bag that is detachably coupled to the base.

8. The device according to claim 1 comprising an additional interface for interfacing the device payload with a decelerating device.

9. The device according to claim 1 comprising an additional interface that comprises one or more Piccatini rails.

10. The device according to claim 1, wherein the device comprises the payload; wherein the payload and the laser markers are positioned at a same side of the device.

11. The device according to claim 1 comprising wired communication ports for receiving communication over wired links; wherein the transceiver is configured to communicate over the wired links and over wireless links.

12. The device according to claim 1 wherein the device consists essentially of the handle, the camera, the infrared illumination elements, the payload compartment, the laser markers, the transceiver, the controller, the base and the rotation and tilt assembly.

13. The device according to claim 1, comprising a frame and a central module; wherein the central module is configured to rotate in relation to the frame; wherein the frame is coupled to the base; wherein the central module comprises the payload compartment, the camera, the laser markers and the infrared illumination elements.

14. The device according to claim 1 wherein the handle is a removably coupled to another component of the robot.

15. A method for dismantling an explosive device, the method comprises: sending from a device an image of an explosive device and laser marks generated by laser markers of the device; wherein the device is positioned, using a handle of the robot, at a desired position by an entity that differs from the robot; wherein when positioned at the desired position the device is configured to dismantle the explosive device using an explosive device dismantling payload that is coupled in a releasable manner to a payload compartment of the robot; receiving, by a transceiver of the robot, a command to dismantle the explosive device and performing, by the explosive device dismantling payload, and in response to the command to dismantle the explosive device, an explosive device dismantling operation.

16. The method according to claim 15 wherein the command to dismantle the explosive device is relayed via a range expansion unit.

\* \* \* \* \*